US009401675B2

(12) United States Patent
Sasaki et al.

(10) Patent No.: US 9,401,675 B2
(45) Date of Patent: Jul. 26, 2016

(54) VEHICLE AC GENERATOR CONTROL APPARATUS

(75) Inventors: Junya Sasaki, Tokyo (JP); Katsuyuki Sumimoto, Tokyo (JP); Keiichi Komurasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/397,652

(22) PCT Filed: Jul. 3, 2012

(86) PCT No.: PCT/JP2012/066934
§ 371 (c)(1),
(2), (4) Date: Oct. 29, 2014

(87) PCT Pub. No.: WO2014/006686
PCT Pub. Date: Jan. 9, 2014

(65) Prior Publication Data
US 2015/0115904 A1    Apr. 30, 2015

(51) Int. Cl.
*H02P 9/10*   (2006.01)
*H02P 9/14*   (2006.01)
*H02P 9/00*   (2006.01)
*H02P 9/48*   (2006.01)
*H02P 9/30*   (2006.01)
*H02P 11/00*   (2006.01)
*H02H 7/06*   (2006.01)
*H02P 101/45*   (2015.01)

(52) U.S. Cl.
CPC ............ *H02P 9/008* (2013.01); *H02P 9/305* (2013.01); *H02P 9/48* (2013.01); *H02P 2101/45* (2015.01)

(58) Field of Classification Search
USPC ..................... 322/22, 59; 290/40 B
See application file for complete search history.

(56) References Cited

U.S. PATENT DOCUMENTS

| 5,510,695 | A | * | 4/1996 | Tanaka | ..................... | H02J 7/163 322/25 |
| 5,663,631 | A | * | 9/1997 | Kajiura | ................. | H02J 7/1492 322/29 |
| 6,727,599 | B2 | * | 4/2004 | Schlangen | .............. | F02N 11/04 123/179.28 |

(Continued)

FOREIGN PATENT DOCUMENTS

| JP | 2000-32680 A | 1/2000 |
| JP | 3070788 B2 | 7/2000 |
| JP | 2011-166910 A | 8/2011 |

OTHER PUBLICATIONS

Communication dated Oct. 27, 2015 from the Japanese Patent Office in counterpart application No. 2014-523468.

(Continued)

*Primary Examiner* — Pedro J Cuevas
(74) *Attorney, Agent, or Firm* — Sughrue Mion, PLLC

(57) ABSTRACT

A vehicle AC generator control apparatus, the rotor of an vehicle AC generator 1 of which is coupled through a torque transfer member with the output axle of an internal combustion engine mounted in a vehicle, is provided with a magnetic-field current control system that can control the value c of a magnetic-field current flowing in a magnetic-field winding 3 of the vehicle AC generator 1 so that the magnetic-field current value c coincides with a magnetic-field current command value b; it is made possible to make the rotation torque of the vehicle AC generator 1 depend only on the rotation speed and to stabilize control of the internal combustion engine.

7 Claims, 3 Drawing Sheets

(56) References Cited

U.S. PATENT DOCUMENTS

| | | | | |
|---|---|---|---|---|
| 7,170,263 B2 * | 1/2007 | Yamamoto | .............. | H02J 7/245 290/40 R |
| 8,033,954 B2 * | 10/2011 | Theobald | ................ | B60K 6/26 477/3 |
| 8,063,499 B2 * | 11/2011 | Wada | ..................... | B60L 11/12 290/40 C |
| 8,736,235 B2 * | 5/2014 | Tabata | .................... | F02N 11/04 322/59 |
| 9,042,147 B2 * | 5/2015 | Ishii | ...................... | H02M 7/003 361/677 |
| 9,242,638 B2 * | 1/2016 | Yamamoto | ............ | B60W 20/10 |
| 2007/0227499 A1 * | 10/2007 | Asada | .................. | H02J 7/1438 123/339.18 |
| 2007/0233332 A1 * | 10/2007 | Kawada | ................. | B60K 6/365 701/13 |
| 2008/0088282 A1 | 4/2008 | Inokuchi et al. | | |
| 2008/0257310 A1 * | 10/2008 | Theobald | ................ | B60K 6/26 123/41 E |
| 2010/0194355 A1 * | 8/2010 | Wada | ...................... | B60L 11/12 322/22 |
| 2011/0193504 A1 | 8/2011 | Nakajima et al. | | |
| 2013/0265808 A1 * | 10/2013 | Ishii | ...................... | H02M 7/003 363/97 |
| 2015/0381003 A1 * | 12/2015 | Rajasingham | ........... | H02K 3/28 310/68 R |
| 2016/0016482 A1 * | 1/2016 | Lee | ..................... | B60L 11/1861 701/22 |
| 2016/0018471 A1 * | 1/2016 | Lee | ...................... | G01R 31/007 702/63 |
| 2016/0091062 A1 * | 3/2016 | Wys | ........................ | F16H 3/727 475/5 |
| 2016/0093927 A1 * | 3/2016 | Marcicki | ............... | H01M 10/48 429/50 |
| 2016/0102679 A1 * | 4/2016 | Iwrey | .................... | F04D 29/646 416/32 |

OTHER PUBLICATIONS

International Search Report for PCT/JP2012/066934 dated Sep. 18, 2012.

Communication dated Apr. 29, 2016, issued by the European Patent Office in corresponding European Application No. 12880529.8.

* cited by examiner

VEHICLE AC GENERATOR CONTROL APPARATUS

CROSS REFERENCE TO RELATED APPLICATIONS

This application is a National Stage of International Application No. PCT/JP2012/066934 filed Jul. 3, 2012, the contents of which are incorporated herein by reference in their entirety.

TECHNICAL FIELD

The present invention relates to a vehicle AC generator control apparatus that controls an AC power generator mounted in a vehicle such as an automobile.

BACKGROUND ART

As is well known, the rotor of a vehicle AC generator is coupled with the output axle of an internal combustion engine through a coupling member such as a belt; transfer of torque between the internal combustion engine and the vehicle AC generator is implemented through a coupling member. Accordingly, the operation state of the vehicle AC generator provides a considerable effect to the operation status of the internal combustion engine. To date, with regard to a control apparatus for this kind of vehicle AC generator, there has been proposed technologies in which a vehicle AC generator and an internal combustion engine are integrally controlled (for example, refer to Patent Document 1).

FIG. 3 is a configuration diagram of such a conventional vehicle AC generator control apparatus as disclosed in Patent Document 1. In FIG. 3, a generator control apparatus 2 provided integrally with a vehicle AC generator 1 is provided with an external command reception unit 8 that receives an external command from an external unit 7 formed of an ECU (Engine Control Unit), an external command/voltage conversion unit 9 that converts a received external command value into a control voltage value, and an external command effective/ineffective determination unit 11 that determines whether the received external command is effective or ineffective.

The generator control apparatus 2 is further provided with a second target voltage command unit 10 that is capable of commanding an output voltage of the vehicle AC generator 1 in addition to the external command, a selector 12 that performs switching between the output of the external and/control voltage conversion unit 9 and the output of the second target voltage command unit 10 and then provides the selected output to a voltage control unit 6, a PWM control unit 5 that controls the on/off period of a switching device 15 formed of a power transistor so as to PWM-control the magnetic-field current of the vehicle AC generator 1, a voltage detection unit 4 that detects the output voltage of the vehicle AC generator 1, and the voltage control unit 6 that provides a PWM control value to the PWM control unit 5, based on the detected output voltage of the vehicle AC generator 1 and the output from the selector 12.

A rectifier 14 converts AC output power induced across an armature winding 13 into DC power and then supplies the DC power to a magnetic-field winding 3 and a high-capacitance capacitor 20. The output voltage of the capacitor 20 is supplied to a vehicle battery 22 and an electric load 23 by way of a DC/DC converter 21.

The external unit 7, which is an ECU, detects the operation status of an internal combustion engine (unillustrated), the state of a mechanical load, the state of the electric load 23, and the like, calculates a reference voltage value of the vehicle AC generator 1, based on the these detection results, and then transmits the external command corresponding to the calculated reference voltage value to the external command reception unit 8 of the generator control apparatus 2. In the case where the external command effective/ineffective determination unit 11 determines that the external command is effective, the voltage control unit 6 makes the PWM control unit 5 on/off-control the switching device 15 so as to PWM-control the magnetic-field current, based on the output voltage of the vehicle AC generator 1, detected by the voltage detection unit 4, and the control voltage value, from the external command/control voltage conversion unit 9, that is provided by way of the selector 12, so that the output voltage of the vehicle AC generator 1 is made to coincide with a value indicated by the external command.

In contrast, in the case where the external command effective/ineffective determination unit 11 determines that the external command is ineffective, the voltage control unit 6 makes the PWM control unit 5 on/off-control the switching device 15 so as to PWM-control the magnetic-field current, based on the output voltage of the vehicle AC generator 1, detected by the voltage detection unit 4, and the output, of the second target voltage command unit 10, that is provided by way of the selector 12, so that the output voltage of the vehicle AC generator 1 is made to coincide with the output of the second target voltage command unit 10.

The conventional vehicle AC generator control apparatus configured as described above controls the output voltage of the vehicle AC generator 1 in accordance with the external command that is given from the external unit 7 to the generator control apparatus 2 so that the internal combustion engine and the vehicle AC generator 1 are integrally controlled; thus, he conventional vehicle AC generator control apparatus can contribute to stabilization of control of an internal combustion engine and to improvement of gasoline mileage.

PRIOR ART REFERENCE

Patent Document

[Patent Document 1] Japanese Patent No. 3070788

DISCLOSURE OF THE INVENTION

Problem(s) to be Solved by the Invention

The rotation torque of a vehicle AC generator can be comprehended by converting the power-generation amount of the vehicle AC generator into the rotation torque; however, the conversion requires calculation utilizing a great number of parameters such as the amount of an electric load on the vehicle AC generator, the temperature of the vehicle AC generator, and the rotation speed thereof. However, it is difficult for an ECU to instantaneously perform the calculation. Accordingly, when the foregoing conventional vehicle AC generator control apparatus operates, it does not comprehend the rotation torque of the vehicle AC generator; therefore, it is not adequate in terms of stabilization of control of an internal combustion engine and improvement of gasoline mileage.

Moreover, in the conventional vehicle AC generator control apparatus, the output voltage of the vehicle AC generator is controlled in such a manner as described above; however, because in the regenerative braking mode, the output voltage cannot be increased up to a voltage exceeding the rated-voltage tolerance range of the vehicle battery 22, effective regenerative braking operation cannot be implemented. Furthermore, the rotation toque of the vehicle AC generator 1 cannot accurately be comprehended; therefore, when in the idle operation mode of the internal combustion engine, the rotation torque of the vehicle AC generator 1 becomes larger than predetermined torque, the engine may stall.

The present invention has been implemented in order to solve the foregoing problems in a conventional vehicle AC generator control apparatus; the objective thereof is to provide a vehicle AC generator control apparatus that can highly contribute to stabilization of control of an internal combustion engine.

Means for Solving the Problems

A vehicle AC generator control apparatus according to the present invention, the rotor of a vehicle AC generator of which is coupled through a torque transfer member with the output axle of an internal combustion engine mounted in a vehicle, is characterized in that there is provided a magnetic-field current control system that can control a value of a magnetic-field current flowing in a magnetic-field winding of the vehicle AC generator, based on a magnetic-field current command value.

Advantage of the Invention

The vehicle AC generator control apparatus according to the Present invention is provided with a magnetic-field current control system that can control the value of a magnetic-field current flowing in the magnetic-field winding of the vehicle AC generator, based on a magnetic-field current command value; therefore, it is made possible to make the rotation torque of the vehicle AC generator depend only on the rotation speed thereof, and hence control of the internal combustion engine can be stabilized.

BEST MODE FOR CARRYING OUT THE INVENTION

Embodiment 1

Figure 1:
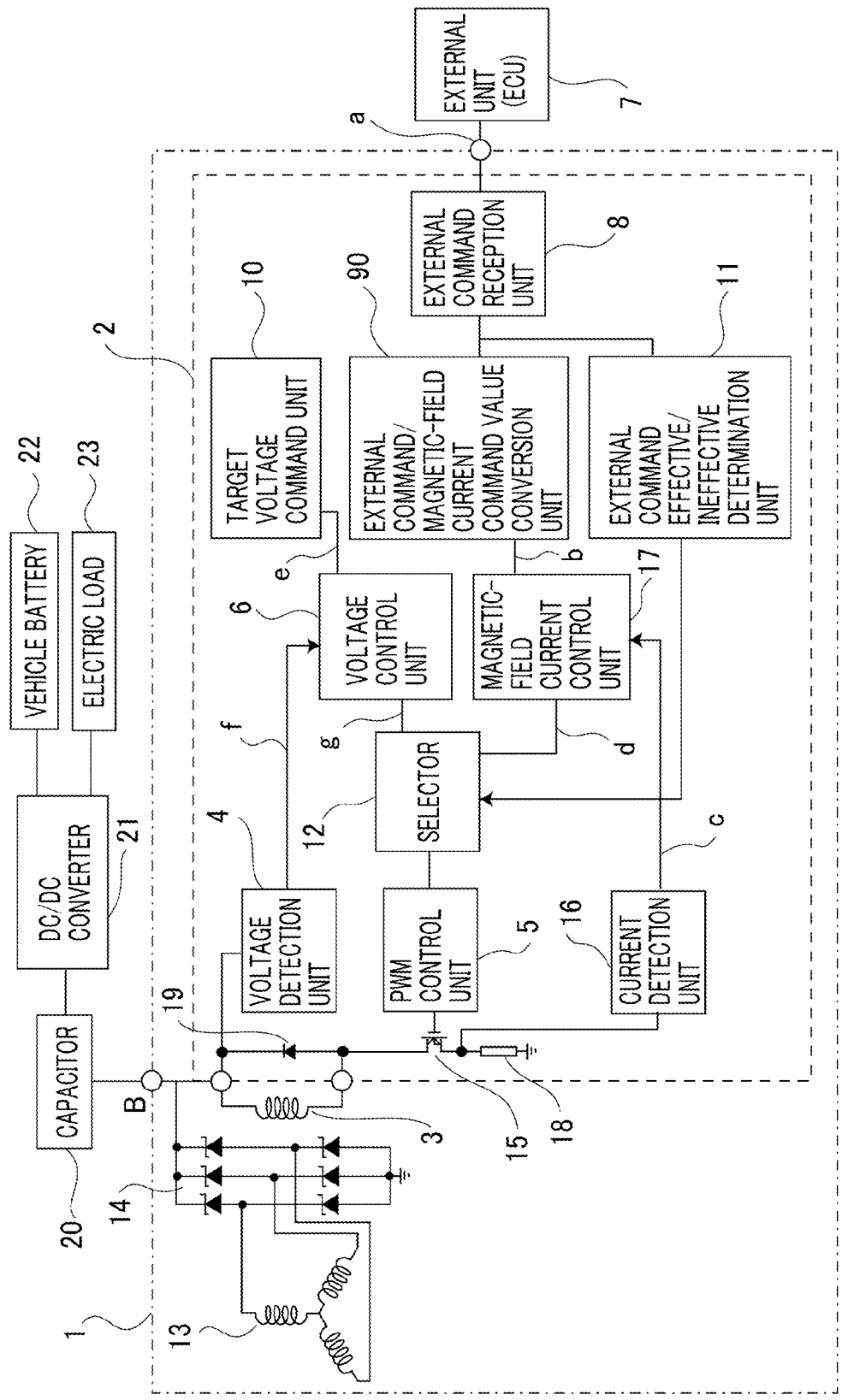
FIG. 1 is a configuration diagram representing a vehicle AC generator control apparatus according to Embodiment 1 of the present invention.

FIG. 1 is a circuit diagram representing a vehicle AC generator control apparatus according to Embodiment 1 of the present invention; only extracted part, which is related to the present invention, is illustrated. In FIG. 1, a vehicle AC generator 1 includes a stator provided with an armature winding 13 and a rotor provided with a magnetic-field winding 3. The rotor is mechanically coupled with the output axle of an internal combustion engine (unillustrated) through a torque transfer member (unillustrated) such as a belt; the vehicle AC generator 1 and the internal combustion engine transfer rotation torque to each other through the torque transfer member. The rotor of the vehicle AC generator 1 is driven to rotate by the internal combustion engine through the torque transfer member, so that three-phase AC electromotive force is induced across the armature winding 13.

A rectifier 14 converts the three-phase AC electromotive force induced across the armature winding 13 into DC power and then supplies the DC power to the magnetic-field winding 3 and a high-capacitance capacitor 20. The output voltage of the capacitor 20 is supplied to a vehicle battery 22 and an electric load 23 by way of a DC/DC converter 21.

A generator control apparatus 2 mounted in the vehicle AC generator 1 is provided with a voltage detection unit 4, a PWM control unit 5, a current detection unit 16, a selector 12, a voltage control unit 6, a current control unit 17, a target voltage command unit an external command/magnetic-field current command value conversion unit 90, an external command effective/ineffective determination unit 11, and an external command reception unit 8. The generator control apparatus 2 is further provided with a flywheel diode 19 connected in parallel with the magnetic-field winding 3, a switching device 15 that is formed of a power transistor and is connected in series with the magnetic-field winding 3, and a current detection resistor 18. The generator control apparatus 2 monitors a magnetic-field current flowing in the magnetic-field winding 3 by use of the current detection resistor 18, as a magnetic-field current sensor, and the current detection unit 16.

Figure 3:
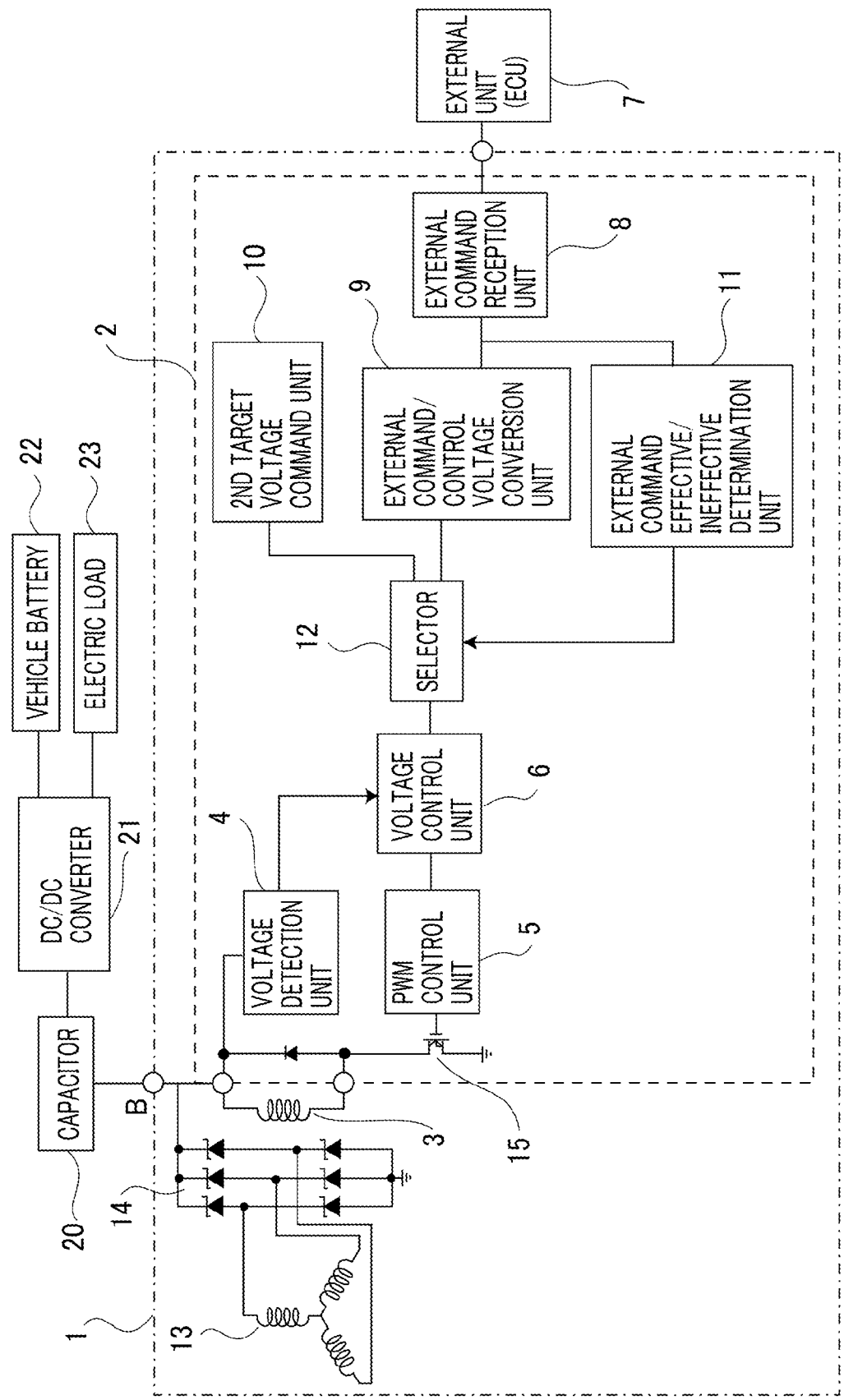
FIG. 3 is a configuration diagram representing a conventional vehicle AC generator control apparatus.

A magnetic-field current control system according to the present invention is configured with the switching device 15, the current detection resistor 18, the current detection unit 16, the PWM control unit 5, the magnetic-field current control unit 17, and the external command/magnetic-field current command value conversion unit 90. In the conventional vehicle AC generator control apparatus represented in FIG. 3, the magnetic-field current value is not controlled and only the voltage is controlled by the voltage control system; however, in the vehicle AC generator control apparatus, represented in FIG. 1, according to Embodiment 1 of the present invention, the function of controlling the magnetic-field current value is added.

An external unit 7, which is an ECU, detects the operation status of the internal combustion engine, the state of a mechanical load, the charging status of the vehicle battery 22, the state of the electric load 23 and the like, calculates a reference magnetic-field current value of the vehicle AC generator 1, based on the these detection results, and then provides an external command a corresponding to the calculated reference magnetic-field current value to the external command reception unit 8 of the generator control apparatus 2. The external command a to be transmitted from the external unit 7 to the generator control apparatus 2 is formed of, for example, a PWM signal. The PWM signal has a DUTY (DUTY=t/T; t is the high-level duration of the PWM signal, and T is the period of the PWM signal). The external command a may be formed of a signal other than a PWM signal; however, a case where the external command a is configured with a PWM signal will be described in the following explanation.

Figure 2:
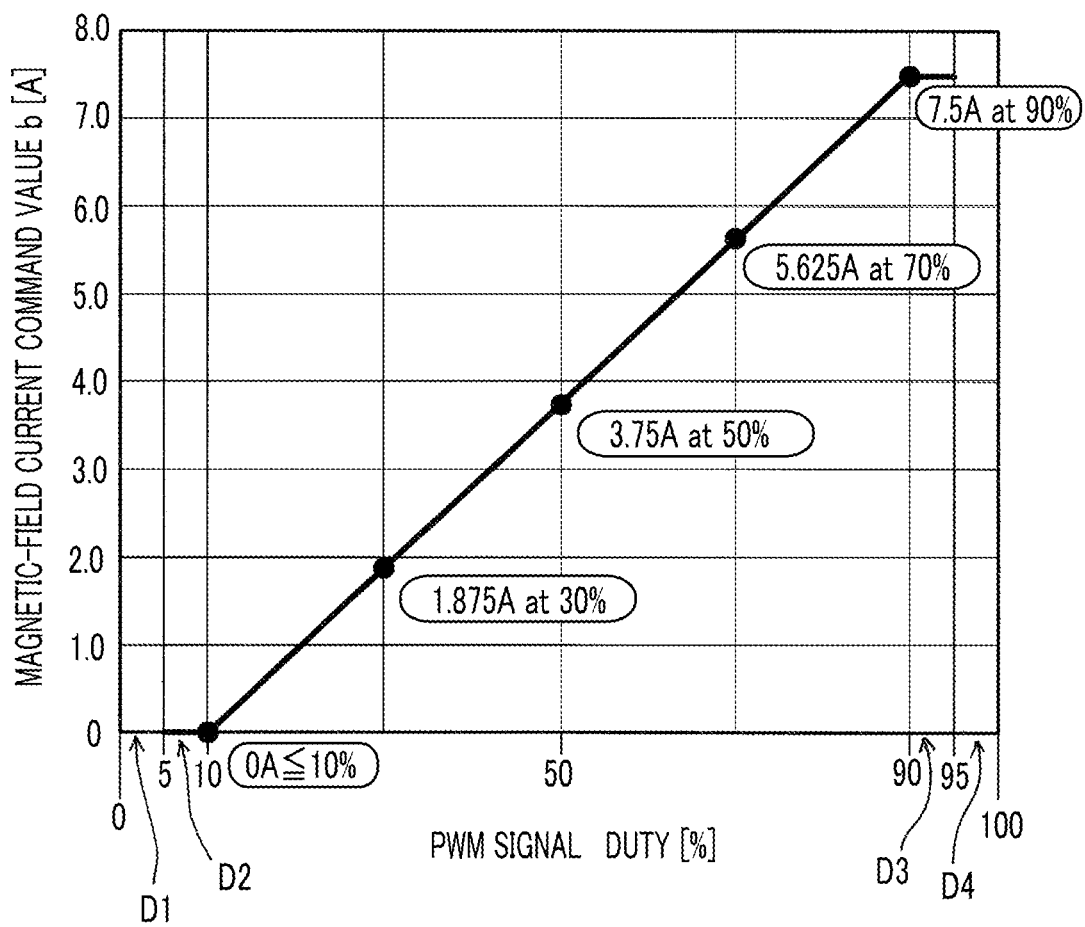
FIG. 2 is an explanatory chart for a map representing the relationship between the magnetic-field current command value and the external command formed of a PWM signal in a vehicle AC generator control apparatus according to Embodiment 1 of the present invention.

The external command/magnetic-field current command value conversion unit 90 in the generator control apparatus 2 converts the external command a received by the external command reception unit 8 into a magnetic-field current command value b. FIG. 2 is an explanatory chart for a map representing the relationship between the magnetic-field current command value b and the external command a formed of a PWM signal in a vehicle AC generator control apparatus according to Embodiment 1 of the present invention; the abscissa denotes the DUTY (%) of the PWM signal, as the external command a, and the ordinate denotes the magnetic-field current command value b (A).

In FIG. 2, as far as the DUTT of the PWM signal is 10[%] or larger but smaller than 90[%], the DUTY of the PWM signal is in proportion to the magnetic-field current command value b; the magnetic-field current command value b is from 0 [A] to 7.5 [A] in proportion to the DUTT of 10[%] or larger but smaller than 90[%]. In contrast, a range D1 where the DUTY is 0[%] or larger but smaller than 5[%] is the one at a time when it is anticipated that a harness for transmitting the external command from the external unit 7 to the generator control apparatus 2 fails; a range D2 where the DUTY is 5[%] or larger but smaller than 10[%] and a range D3 where the DUTY is 90[%] or larger but smaller than 95[%] are the ones where an error in the waveform of the PWM signal is absorbed; a range D4 where the DUTY is 95[%] or larger is the one at a time when it is anticipated that the harness for transmitting the external command fails. In the DUTY ranges D1 and D2, the magnetic-field current command value b is a constant value of 0 [A]; in the DUTY ranges D3 and D4, the magnetic-field current command value b is a constant value of 7.5 [A].

Based on the map represented in FIG. 2, the external command/magnetic-field current command value conversion unit 90 converts the DUTY of the PWM signal, as the external command a, received by the external command reception unit 8 into the magnetic-field current command value b and provides the magnetic-field current command value b to the magnetic-field current control unit 17. The magnetic-field current control unit 17 obtains the difference between the magnetic-field current command value b from the external command/magnetic-field current command value conversion unit 90 and a magnetic-field current value c detected by the current detection unit 16 and creates a magnetic-field current control value d for making the difference zero.

The voltage control unit 6 obtains the difference between a target voltage value e from the target voltage command unit 10 and an output voltage value f of the vehicle AC generator 1 detected by the voltage detection unit 4 and creates a voltage control value g for making the difference zero. The target voltage value e generated by the target voltage command unit 10 is a control value, as a fail-safe value, at a time when as described later, it is determined that the external command a is ineffective; for example, the target voltage value e is set to a value that is the same as or slightly larger than the rated output voltage value of the vehicle battery 22.

The external command effective/ineffective determination unit 11 determines whether or not the external command a received from the external command reception unit 8 is effective. This determination is implemented based on whether the DUTY of the PWM signal, as the external command a, is in the range D1 or D4 represented in FIG. 2; for example, as described above, in the case where the DUTY of the PWM signal is in the range D1 or D4, a failure such as wire breaking of the harness for transmitting the external command to the generator control apparatus 2 or a short-to-ground accident of the harness for transmitting the external command is anticipated; thus, it is determined that the external command a is ineffective. In the case where the DUTY of the PWM signal is neither in the range D1 nor in the range D4, it is determined that the external command a is effective.

In the case where the result of the determination by the external command effective/ineffective determination unit 11 is "effective", the selector 12 selects the magnetic-field current control value d from the magnetic-field current control unit 17 and provides it to the PWM control unit 5; in the case where the result of the determination by the external command effective/ineffective determination unit 11 is "ineffective", the selector 12 selects the voltage control value g from the voltage control unit 6 and provides it to the PWM control unit 5. Based on the magnetic-field current control value d from the magnetic-field current control unit 17 or the voltage control value a from the voltage control unit 6, selected by the selector 12, the PWM control unit 5 makes the switching device 15 PWM-control the magnetic-field current value.

In the vehicle AC generator control apparatus according to Embodiment 1 of the present invention, in the case where the external command effective/ineffective determination unit 11 determines that the external command a given by the external command reception unit 8 is "effective", the selector 12 selects the magnetic-field current control value d created by the magnetic-field current control unit 17 and provides it to the PWM control unit 5. Based on the magnetic-field current control value d given by the magnetic-field current control unit 17, the PWM control unit 5 determines the duty of the on/off control of the switching device 15 and provides it to the base of the switching device 15. As a result, the magnetic-field current value c is controlled so as to coincide with the external command a. Accordingly, when the external command a is constant, the magnetic-field current value c is controlled so as to be constant.

The magnetic-field current value and the rotation torque of a vehicle AC generator are related to each other; therefore, when the rotation speed of the vehicle AC generator and the magnetic-field current value are known, the rotation torque of the vehicle AC generator 1 can be estimated. In such a manner as described above, the ECU that forms the external unit 7 can directly control the magnetic-field current value of the vehicle AC generator 1. The ECU can accurately comprehend the rotation torque of the vehicle AC generator 1 by learning the magnetic-field current value; thus, by controlling the magnetic-field current value c, the ECU can control the rotation torque of the vehicle AC generator 1.

As described above, in the vehicle AC generator control apparatus according to Embodiment 1 of the present invention, the rotation torque of the vehicle AC generator 1 is comprehended based on the magnetic-field current value and then the magnetic-field current value c can be controlled; therefore, because no engine stall is caused at a time when the internal combustion engine is in the idle driving state, the vehicle AC generator control apparatus according to Embodiment 1 of the present invention can contribute to stabilization of control of an internal combustion engine and to improvement of gasoline mileage.

In the case where the external command effective/ineffective determination unit 11 determines that the external command a given by the external command reception unit 8 is "ineffective", the selector 12 selects the voltage control value g given by the voltage control unit 6 and provides it to the PWM control unit 5. As a result, based on the voltage control value g given by the voltage control unit 6, the PWM control unit 5 determines the duty of the on/off control of the switching device 15 and provides it to the base of the switching device 15. Thus, the output voltage value of the vehicle AC generator 1 is controlled so as to coincide with the target voltage value e provided by the target voltage command unit 10.

Accordingly, even when due to some causes, the external command a from the external unit 7 becomes abnormal, switching to the voltage control system configured with the voltage detection unit 4, the voltage control unit 6, and the target voltage command unit 10 is implemented, as described above; therefore, the vehicle AC generator 1 is prevented from falling into a critical malfunction such as an excessive voltage or non-generation.

The vehicle AC generator control apparatus, described heretofore, according to Embodiment 1 of the present invention is characterized as follows.

(1) A vehicle AC generator control apparatus, a rotor of a vehicle AC generator of which is coupled through a torque transfer member with an output axle of an internal combustion engine mounted in vehicle, the vehicle AC generator control apparatus including a magnetic-field current control system that can control the value c of a magnetic-field current flowing in a magnetic-field winding 3 of the vehicle AC generator 1 so that the magnetic-field current value c coincides with a magnetic-field current command value b.

The vehicle AC generator control apparatus configured as described above can make the rotation torque of the vehicle AC generator 1 depend only on the rotation speed thereof; thus, control of the internal combustion engine can be stabilized.

(2) A vehicle AC generator control apparatus-characterized in that the magnetic-field current command value b is created based on an external command a from an external unit.

The vehicle AC generator control apparatus configured as described above makes it possible that an external unit 7 operates the rotation torque of the vehicle AC generator 1; thus, regenerative control and the like can effectively be implemented.

(3) A vehicle AC generator control apparatus characterized by including a current detection unit 16 that detects the magnetic-field current value, an external command reception unit 8 that receives the external command a from the external unit 7, an external command/magnetic-field current command value conversion unit 90 that converts the received external command a into the magnetic-field current command value b, and a magnetic-field current control unit 17 that creates a magnetic-field current control value d for controlling the magnetic-field current value, based on the created magnetic-field current command value b and the detected magnetic-field current value c, and characterized in that the magnetic-field current value c is controlled based on the created magnetic-field current control value d.

The vehicle AC generator control apparatus configured as described above makes it possible that an external unit 7 operates the rotation torque of the vehicle AC generator 1; thus, regenerative control and the like can effectively be implemented.

(4) A vehicle AC generator control apparatus characterized by including an external command effective/ineffective determination unit 11 that determines whether or not the external command a received from the external unit 7 is effective, and a voltage control unit that can control the output voltage of the vehicle AC generator 1 by controlling the magnetic-field current value c regardless of the external command a, and characterized in that in the case where the external command effective/ineffective determination unit 11 determines that the external command a is effective, the magnetic-field control system controls the magnetic-field current value c and in that in the case where the external command effective/ineffective determination unit 11 determines that the external command a is ineffective, the voltage control system controls the magnetic-field current value c.

The vehicle AC generator control apparatus configured as described above makes it possible that an external unit 7 operates the rotation torque of the vehicle AC generator 1; thus, regenerative control and the like can effectively be implemented, and even when the external unit fails, stable electric power can be supplied to a vehicle.

(5) A vehicle AC generator control apparatus characterized by including a PWM control unit 5 and characterized in that the PWM control unit 5 PWM-controls the magnetic-field current value c.

The vehicle AC generator control apparatus configured as described above can readily control the magnetic-field current value c, and hence it is made possible to make the rotation torque of the vehicle AC generator 1 depend only on the rotation speed; thus, control of the internal combustion engine can be stabilized.

(6) A vehicle AC generator control apparatus characterized in that the external command a is formed of a PWM signal provided with a duty corresponding to a reference magnetic-field current value and in that the external command/magnetic-field current command value conversion unit 90 creates the magnetic-field current command value b, based on the duty of the PWM signal received by the external command reception unit 8.

The vehicle AC generator control apparatus configured as described above makes it possible that the external unit 7 readily operates the rotation torque of the vehicle AC generator 1; thus, regenerative control and the like can effectively be implemented.

In the scope of the present invention, the embodiments thereof can appropriately be modified or omitted.

INDUSTRIAL APPLICABILITY

The present invention can be utilized not only in an AC power generator for a vehicle such as an automobile but also in the field of the automobile industry.

DESCRIPTION OF REFERENCE NUMERALS

1: vehicle AC Generator
2: generator control apparatus
3: magnetic-field winding
4: voltage detection unit
5: PWM control unit
6: voltage control unit
7: external unit
8: external command reception unit
90: external command/magnetic-field current command value conversion unit
10: target voltage command unit
11: external command effective/ineffective determination unit
12: selector
13: armature winding
14: rectifier
15: switching device
16: current detection unit
17: magnetic-field current control unit
18: current detection resistor
19: flywheel diode
20: capacitor
21: DC/DC converter
22: vehicle battery
23: electric load
a: external command
b: magnetic-field current command value
c: magnetic-field current value
d: magnetic-field current control value
e: target voltage value f: output voltage value
g: voltage control value

The invention claimed is:

1. A vehicle AC generator control apparatus,
wherein a rotor of a vehicle AC generator is coupled through a torque transfer member with an output axle of an internal combustion engine mounted in a vehicle, and
wherein there is provided a magnetic-field current control system that can control a value of a magnetic-field current flowing in a magnetic-field winding of the vehicle AC generator, based on a magnetic-field current command value.

2. The vehicle AC generator control apparatus according to claim 1, wherein the magnetic-field current command value is created based on an external command from an external unit.

3. The vehicle AC generator control apparatus according to claim 2,
wherein the magnetic-field current control system includes a current detection unit that detects the magnetic-field current value, an external command reception unit that receives the external command from the external unit, an external command/magnetic-field current command value conversion unit that converts the received external command into the magnetic-field current command value, and a magnetic-field current control unit that creates a magnetic-field current control value for controlling the magnetic-field current value, based on the created magnetic-field current command value and the detected magnetic-field current value; and
wherein the magnetic-field current value is controlled based on the created magnetic-field current control value.

4. The vehicle AC generator control apparatus according to any one of claim 2, further including an external command effective/ineffective determination unit that determines whether or not the external command received from the external unit is effective and a voltage control system that can control an output voltage of the vehicle AC generator by controlling the magnetic-field current value regardless of the external command,
wherein in the case where the external command effective/ineffective determination unit determines that the external command is effective, the magnetic-field control system controls the magnetic-field current value; and
wherein in the case where the external command effective/ineffective determination unit determines that the external command is ineffective, the voltage control system controls the magnetic-field current value.

5. The vehicle AC generator control apparatus according to claim 1, further including a PWM control unit, wherein the PWM control unit PWM-controls the magnetic-field current value.

6. The vehicle AC generator control apparatus according to claim 3,
wherein the external command is formed of a PWM signal provided with a duty corresponding to a reference magnetic-field current value calculated by the external unit, and
wherein the external command/magnetic-field current command value conversion unit creates the magnetic-field current command value, based on the duty of the PWM signal received by the external command reception unit.

7. The vehicle AC generator control apparatus according to claim 3, further including an external command effective/ineffective determination unit that determines whether or not the external command received from the external unit is effective and a voltage control system that can control an output voltage of the vehicle AC generator by controlling the magnetic-field current value regardless of the external command,
wherein in the case where the external command effective/ineffective determination unit determines that the external command is effective, the magnetic-field control system controls the magnetic-field current value; and
wherein in the case where the external command effective/ineffective determination unit determines that the external command is ineffective, the voltage control system controls the magnetic-field current value.

* * * * *